United States Patent
Ceccarelli et al.

[11] Patent Number: 6,076,708
[45] Date of Patent: Jun. 20, 2000

[54] PRE-MEASURED LIQUID DISPENSER

[76] Inventors: Loreto J. Ceccarelli; Antonio Ceccarelli, both of 24 Tortoise Court, Brampton, Ontario, Canada, L6T 3Z8

[21] Appl. No.: 08/982,738

[22] Filed: Dec. 2, 1997

[51] Int. Cl.[7] ....................................................... B67D 5/58
[52] U.S. Cl. ...................... 222/189.1; 222/442; 222/444; 222/456; 222/464.7; 222/481.5
[58] Field of Search ................................ 222/189.1, 207, 222/441, 442, 444, 454, 456, 464.7, 481.5

[56] References Cited

U.S. PATENT DOCUMENTS

| | | |
|---|---|---|
| 298,778 | 5/1884 | Rogers, Jr. . |
| 1,555,591 | 9/1925 | Larrison . |
| 1,770,185 | 7/1930 | Stewart . |
| 1,799,401 | 4/1931 | Yancey . |
| 1,966,754 | 7/1934 | Dennis et al. ............................ 120/69 |
| 2,114,168 | 4/1938 | Auger ........................................ 251/11 |
| 2,282,825 | 5/1942 | Puffer ...................................... 308/121 |
| 2,446,085 | 7/1948 | Gronemeyer et al. .................. 222/446 |
| 2,693,301 | 11/1954 | Allen, Jr. ................................ 222/456 |
| 2,704,623 | 3/1955 | Yasso ...................................... 222/456 |
| 2,747,776 | 6/1956 | Hentschke et al. ..................... 222/456 |
| 2,812,120 | 11/1957 | Beall, Jr. ............................... 222/481.5 |
| 2,943,767 | 7/1960 | Moro-Lin ................................ 222/207 |
| 2,986,310 | 5/1961 | Spaulding ............................ 222/481.5 |
| 2,989,216 | 6/1961 | Moro-Lin ................................ 222/207 |
| 3,023,937 | 3/1962 | Matter ..................................... 222/440 |
| 3,223,295 | 12/1965 | Falerni et al. .......................... 222/438 |
| 3,224,652 | 12/1965 | Ladwig et al. ......................... 222/442 |
| 3,229,854 | 1/1966 | Turnquist ................................. 222/67 |
| 3,841,534 | 10/1974 | Hirdes ..................................... 222/457 |
| 4,024,992 | 5/1977 | Schmid .................................... 222/211 |
| 4,424,921 | 1/1984 | Feuerstein et al. ..................... 222/456 |
| 4,666,065 | 5/1987 | Ohren ...................................... 222/109 |
| 4,684,045 | 8/1987 | Su ............................................ 222/456 |
| 4,763,816 | 8/1988 | Lee .......................................... 222/207 |
| 4,763,817 | 8/1988 | Lee .......................................... 222/207 |
| 4,828,149 | 5/1989 | Hester ..................................... 222/207 |
| 4,871,095 | 10/1989 | Song ....................................... 222/437 |
| 5,078,305 | 1/1992 | Glynn et al. ............................ 222/442 |
| 5,122,272 | 6/1992 | Iana et al. ............................. 222/189.1 |
| 5,127,553 | 7/1992 | Weinstein ................................ 222/207 |
| 5,323,938 | 6/1994 | Ceccarelli et al. ..................... 222/442 |
| 5,449,097 | 9/1995 | Meyer ..................................... 222/456 |

FOREIGN PATENT DOCUMENTS

| | | |
|---|---|---|
| 175256 | 3/1986 | European Pat. Off. . |
| 1064934 | 10/1952 | France . |
| 362461 | 6/1930 | United Kingdom . |
| WO90/10199 | 9/1990 | WIPO . |

*Primary Examiner*—Joseph A. Kaufman
*Attorney, Agent, or Firm*—Ridout & Maybee

[57] ABSTRACT

A device for dispensing a pre-determined volume of liquid from a container. The device comprises a pour spout adapted for coupling to the mouth of the container, an inverted cup including an open mouth and a discharge port communicating with the interior of the cup, and a dispensing tube coupling the pour spout to the discharge port. A check valve is provided inside the cup. The container has a bottom which includes a well having a base and a shoulder. The open mouth is adapted for sealing against the shoulder such that the cup, when disposed in the container, defines a measuring reservoir including an inlet port.

17 Claims, 5 Drawing Sheets

PRE-MEASURED LIQUID DISPENSER

FIELD OF THE INVENTION

This invention relates to a liquid dispensing device. More particularly, the invention relates to a device for accurately dispensing a pre-measured amount of liquid from inside a container.

BACKGROUND OF THE INVENTION

For some time, it has been desirable to accurately and consistently dispense a known volume of liquid from inside a container. Many attempts have been made to address this need.

For example, both Hester (U.S. Pat. No. 4,828,149) and Moro-Lin (U.S. Pat. No. 2,989,216) teach squeezable liquid dispensers. In each of these dispensers, a reservoir is formed in the bottom of a flexible container, and a funnel is positioned in the reservoir. The funnel is connected to a hollow tube which extends through one end of the container. When the dispensers are upright, liquid enters the funnel and flows into the tube. The liquid contained in the funnel can be dispensed when the dispensers are inverted. However, when the dispensers are upright, the height of the liquid in the tube will continue to rise until it equals the height of the liquid in the container. As a result, the volume of liquid to be dispensed depends upon the volume of liquid in the container.

In U.S. Pat. No. 2,943,767, Moro-Lin teaches another squeezable liquid dispenser. The dispenser comprises a squeezable container, and an inverted-funnel-shaped measuring cup provided inside the container. The funnel is vertically displaced from the bottom end of the container by a vertically-projecting ring, and is coupled at its upper opening to a tube which extends through the opposite end of the container. A buoyant ball is provided inside the funnel, and is free to move between the vertically-projecting ring and the upper opening of the funnel. When the container is upright, liquid contained in the container enters the funnel. As the liquid fills the funnel, the ball rises until it seals against the upper opening of the cup, whereupon further liquid flow ceases. When the container is inverted, the ball moves away from the upper opening, allowing the liquid retained in the funnel to be dispensed through the tube.

There is an apparent problem with this device, namely that the buoyant ball is free to move inside the entire volume occupied by the funnel. If the container was rotated slowly from the upright position to the inverted position, the ball could move upwards, away from the upper opening of the funnel. At the same time, liquid could still enter the funnel and flow into the tube. As a result, it appears that the device would only be effective in dispensing a controlled volume of liquid if the container was rapidly inverted.

Accordingly, there remains a need for a liquid dispensing device which can accurately and consistently dispense a pre-determined volume of liquid.

SUMMARY OF THE INVENTION

According to the invention, there is provided an improved dispensing device which can be inserted into a container to accurately and consistently dispense a known volume of liquid from the container. The dispensing device is simple and inexpensive to manufacture, and can be easily disassembled for cleaning.

According to the invention, the device for dispensing liquid from a container having a mouth comprises a pour spout adapted for coupling to the mouth of the container; an inverted cup including an interior cavity, a check valve disposed in the interior cavity, and a discharge port and an open mouth communicating with the interior cavity; and a dispensing tube coupling the pour spout to the discharge port, wherein the container comprises a side wall coupled to a bottom, the bottom including a well portion having a base and a shoulder, and the open mouth being adapted for sealing against the shoulder such that the cup, when disposed in the container, defines a measuring reservoir and includes an inlet port for receiving liquid.

BRIEF DESCRIPTION OF THE DRAWINGS

Reference will now be made to the accompanying drawings which show, by way of example, the preferred embodiment of the invention, and in which.

DESCRIPTION OF THE PREFERRED EMBODIMENT

Figure 1:
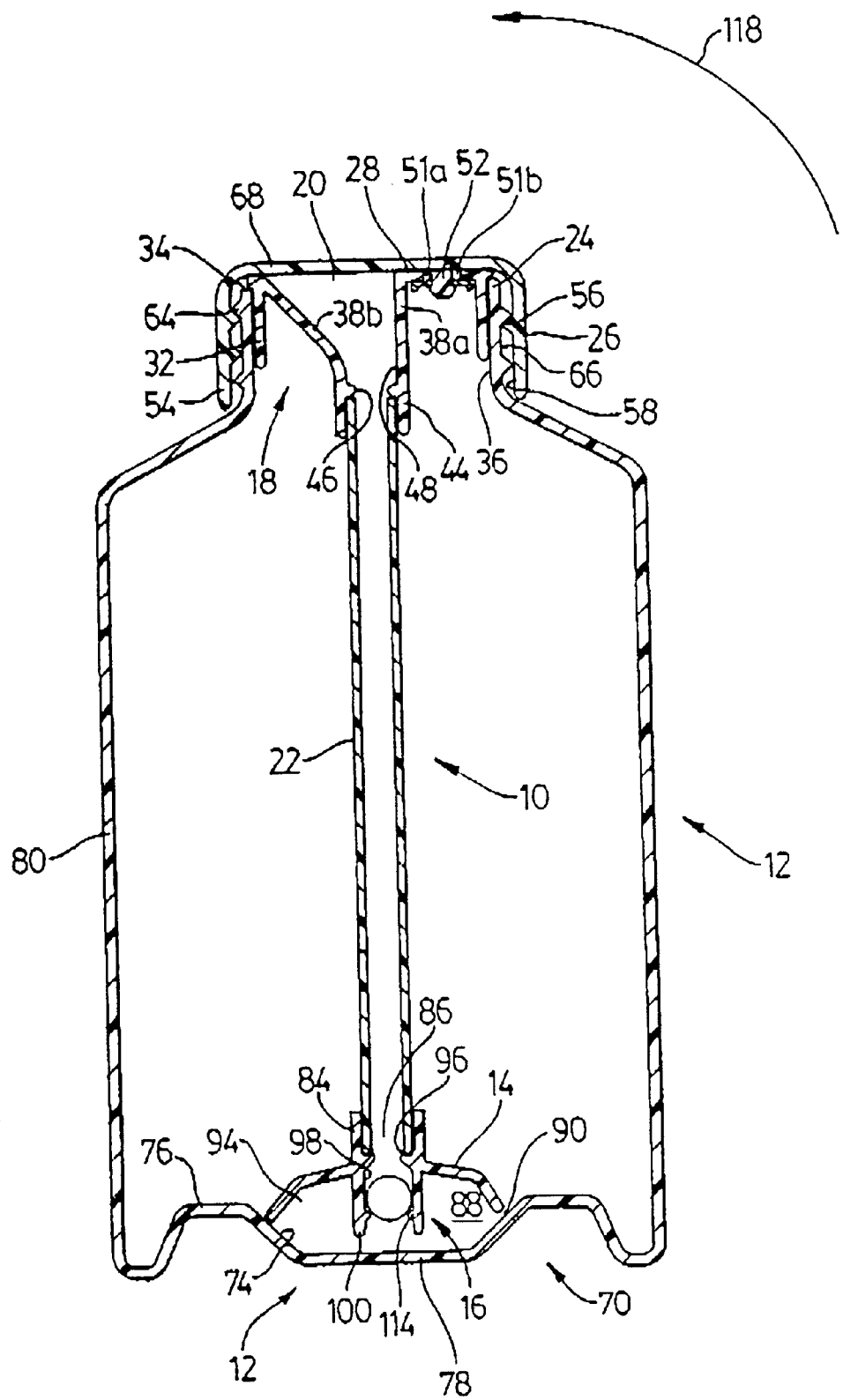
FIG. 1 is a longitudinal cross-sectional view of a liquid dispensing device according to the present invention, shown inserted into a container.
Figure 2:
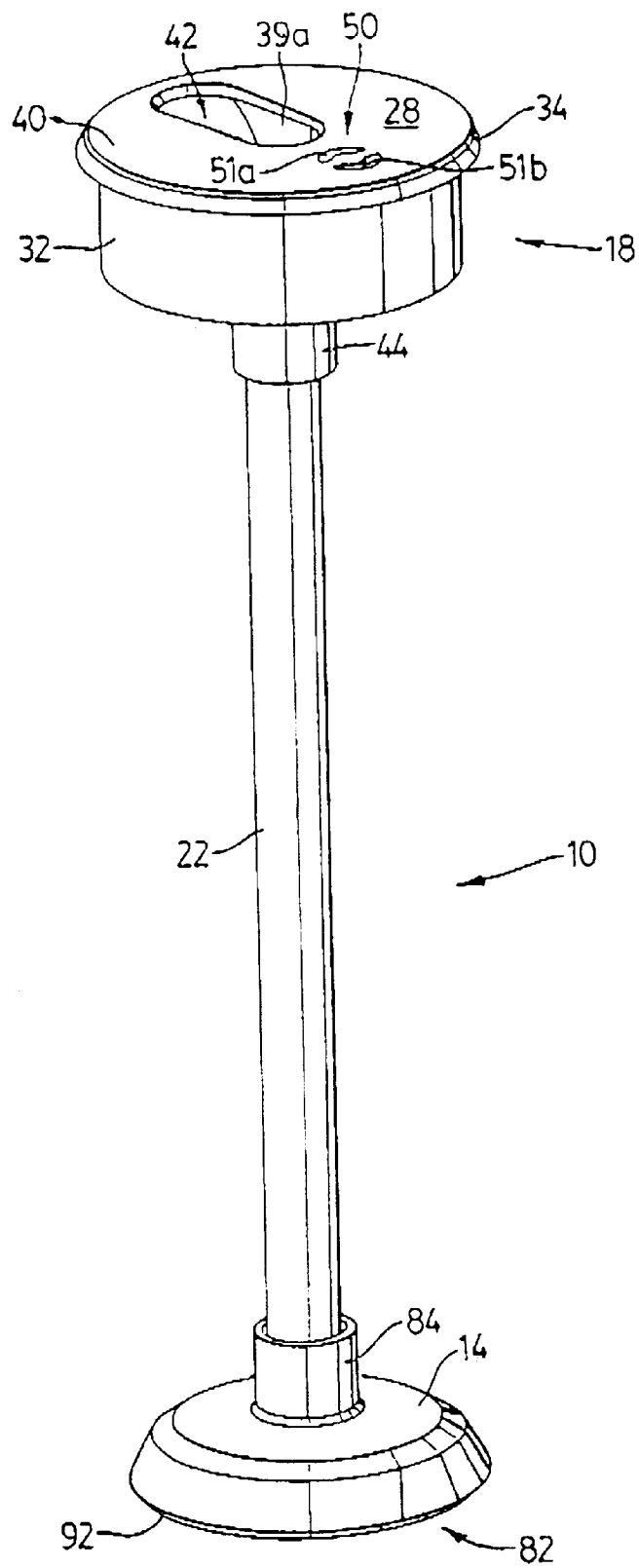
FIG. 2 is a perspective view of the liquid dispensing device, showing the lid, the pour spout, the dispensing tube, and the cup.

Reference will now be made to the drawings, wherein like reference numerals indicate like elements.

In FIG. 1, a liquid dispensing device, denoted generally as 10, is shown inserted into a container 12, and comprising an inverted-funnel-shaped measuring cup 14, a check valve 16, and a lid 18. The lid 18 includes a pour spout 20 coupled to the measuring cup 14 through a dispensing tube 22.

As shown in FIGS. 1 thru 5, the lid 18 is secured to the mouth 24 of the container 12 through a sealing ring 26. The lid 18 comprises a disc-shaped sealing plate 28 coupled at its lower surface 30 to a substantially-cylindrical side wall 32. The lid 18 is provided with a radially-extending lip 34 around the perimeter of the lid 18. The side wall 32 is dimensioned to fit snugly against the inner cylindrical surface 36 of the mouth 24 to prevent fluid loss when the container 12 is inverted. The lip 34 engages the upper-most edge of the mouth 24 to prevent the lid 18 from falling into the container 12.

Figure 3:
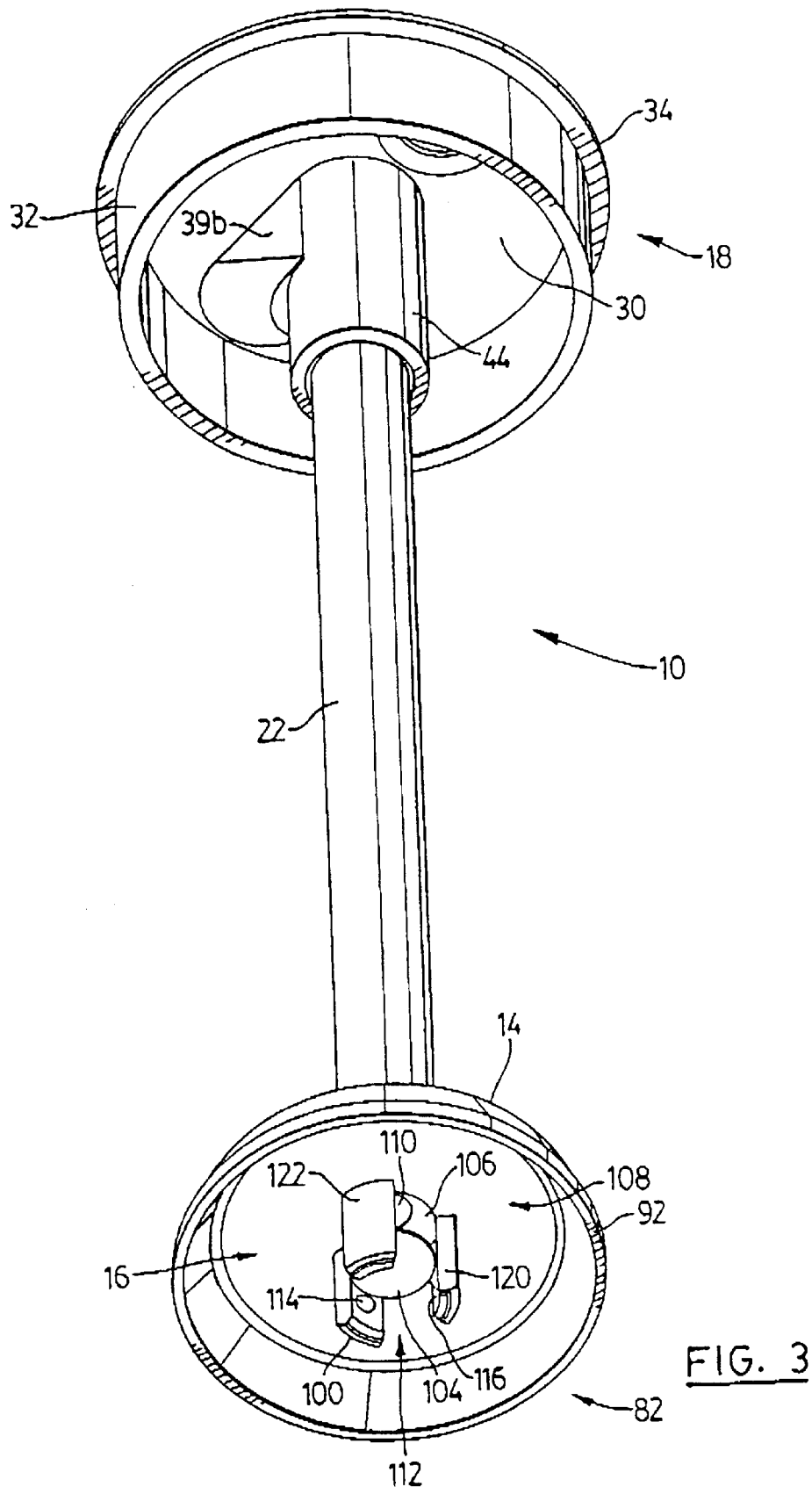
FIG. 3 is a bottom perspective view of the liquid dispensing device, showing the lid, the dispensing tube, the cup, and the check valve.
Figure 4:
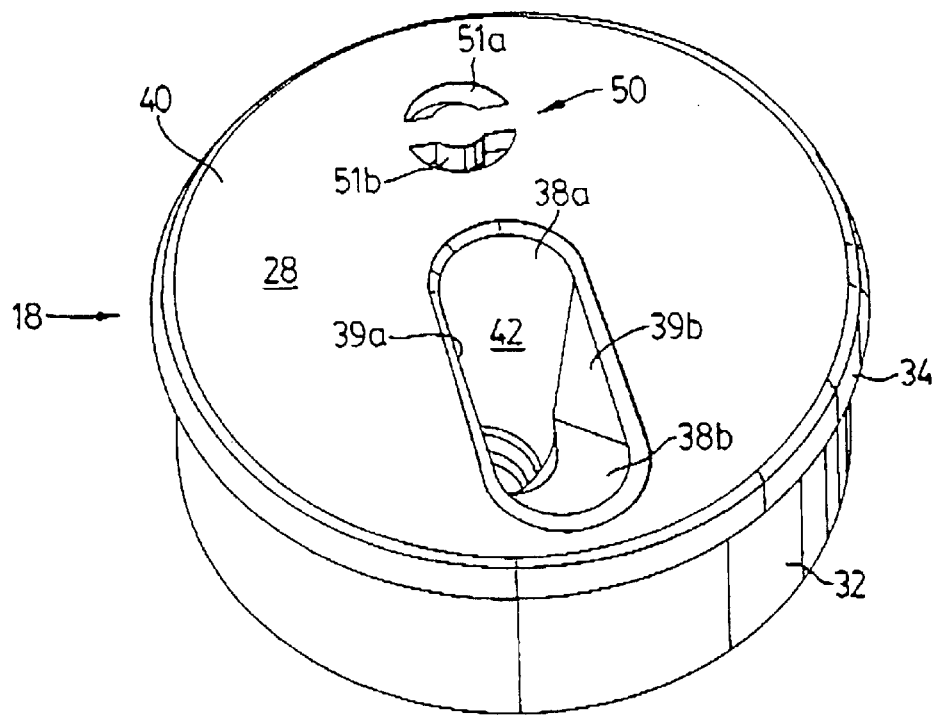
FIG. 4 is an upper perspective view of the lid, showing the pour spout and the pressure equalization means.
Figure 5:
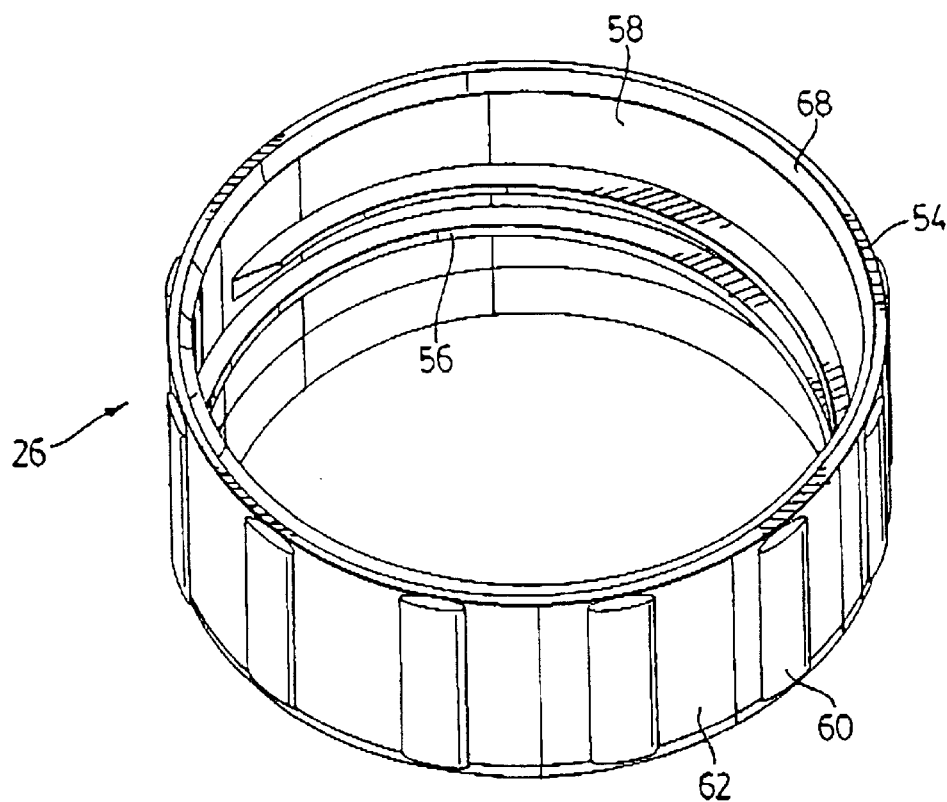
FIG. 5 is an upper perspective view of the sealing ring.

As described above, the lid 18 includes a pour spout 20. The pour spout 20 is in the shape of a laterally-flattened cone having a substantially vertical end wall 38a (FIG. 1), an end wall 38b (FIG. 1) sloping inwards towards the centre of the lid 18, and a pair of parallel side walls 39a (FIG. 2), 39b (FIG. 3). The walls 38, 39 of the pour spout 20 extend downwardly from the upper surface 40 of the lid 18 to form a mouth 42. When viewed from above, the mouth 42 has a substantially-elliptical cross-section whose major axis extends radially outwards from the centre of the lid 18. The mouth 42 terminates at its lower portion in a substantially-cylindrical collar 44. The collar 44 is provided with a protrusion 46 radiating inwardly from the inner surface 48 of the collar 44.

A pressure equalizer 50 is provided in the lid 18, extending between the upper surface 40 and the lower surface 30. The purpose of the pressure equalizer 50 is to reduce any pressure imbalance which may develop when the liquid contained in the container 12 is dispensed. The pressure equalizer 50 is shown comprising a pair of crescent-shaped vents 51*a*, 51*b* extending between the upper surface 40 and the lower surface 30, and a diaphragm 52 acting against the lower surface 30. It will be appreciated that when the pressure acting on the exterior of the container 12 exceeds the pressure inside the container 12, the diaphragm 52 will separate from the lower surface 30 and allow the external pressure and internal pressure to equalize through the vents 51*a*, 51*b*. In order to prevent fluid loss when the container 12 is inverted, the vents 51*a*, 51*b* are positioned diametrically opposite to the inwardly-sloping end wall 38*b* of the pour spout 20. Preferably, the lid 18 is injection molded from injection-moldable plastic, such that the sealing plate 28, side wall 32, pour spout 20, and vents 51*a*, 51*b* form a single plastic piece.

The pressure equalizer 50 need not comprise vents 51*a*, 51*b*, and a diaphragm 52 but could be replaced with any suitable pressure equalizer known in the art. In addition, the pressure equalizer can be eliminated altogether to produce a squeeze-bottle liquid dispenser.

The sealing ring 26 comprises a substantially-cylindrical wall 54 of a diameter slightly larger than the diameter of the mouth 24 of the container 12. The wall 54 includes a plurality of threads 56 on the inner surface 58 of the wall 54, and a plurality of knurled ridges 60 on the outer surface 62. The threads 56 are adapted to engage similar threads 64 radiating outwards from the external surface 66 of the neck 24. The sealing ring 26 also includes a lip 68 radiating inwards from the upper edge of the ring 26 for engaging the upper surface 40 of the lid 18.

It will be appreciated that the lid 18 is secured to the neck 24 by first sliding the side wall 32 of the lid 18 into the container 12 until the lip 34 of the lid 18 abuts against the upper edge of the neck 24. The sealing ring 26 is then placed concentrically over the lid 18 with the threads 56 of the ring 26 engaging the threads 64 of the neck 24. The sealing ring 26 is then drawn downwards by rotating the sealing ring 26 until the lip 68 of the ring 26 engages the upper surface 40 of the lid 18. At this point, the lip 34 of the lid 28 presses downwards against the upper edge of the neck 24, thereby providing a leak resistant seal between the lid 18 and the neck 24.

Turning briefly to FIG. 1, the bottom 70 of the container 12 is shown including a well 72 located centrally within the bottom 70. The well 72 has a substantially circular cross-section and a frusto-conically shape and comprises a shoulder 74 which slopes to a substantially-planar base 78 in the bottom 70. The container 12 may be injection molded from injection-moldable plastic such that the sides 80 of the container 12, the well 72 and the recessed surface 76 form a single plastic piece.

Returning to FIGS. 1 thru 5, a measuring cup 14 having a substantially circular cross-section is shown including an open mouth 82 at one end, and a cylindrical collar 84 defining a discharge orifice 86 at the other end. The mouth 82 is adapted to seal against the shoulder 74, in a manner to be described, to define a measuring reservoir 88 having a predetermined volume. The measuring reservoir 88 includes an inlet port 90 along the outer peripheral edge 92 of the reservoir 88, diametrically opposite the end wall 38*b* of the pour spout 20, to allow liquid to pass into the interior cavity 94 of the measuring reservoir 88. The inlet port 90 may comprise a passageway in the cup 14, the shoulder 74, or both. As will become apparent, the volume of liquid to be dispensed is predetermined by the volume of the measuring reservoir 88. In one embodiment, the volume of the cup 14 and the volume of the well 72 are equal, such that the cup 14 and the well 72 each provide 50% of the total volume of liquid dispensed.

The cylindrical collar 84 includes a protrusion 96 radiating inwardly from the inner surface 98 of the collar 84. The dispensing tube 22 comprises a hollow, cylindrical tube and is dimensioned to be snugly received in the interior of the collar 44 at one end, and in the interior of the collar 84 at the other end. It will be appreciated that the protrusions 46, 96 act as stops directed against the respective ends of the dispensing tube 22. However, as can be seen from FIG. 6 and 7, the dispensing tube 22 can be dimensioned such that the collars 44, 84 are snugly received within the interior of the dispensing tube 22, with the advantage that the protrusions 46, 96 can be eliminated.

Turning to FIG. 3, the check valve 16 is shown comprising a tubular valve guide 100 having an internal passageway 102 (FIGS. 6, 7), a float means 104 provided in the internal passageway 102, and a valve seat 106 formed in the bottom surface 108 of the cup 14. Preferably, the valve guide 100 and the cup 14 are injection molded from injection-moldable plastic such that the valve guide 100 and the cup 14 form a single plastic piece. However, the valve guide 100 may also be fabricated separately from the cup 14 and secured to the bottom surface 108 of the cup 14 by any suitable securing means known in the art.

The end of the valve guide 100 adjacent the valve seat 106 defines a fluid outlet 110 and is coupled to the discharge orifice 86 of the measuring cup 14. The other end of the valve guide 100 defines a fluid inlet 112 which opens into the interior cavity 94 of the measuring reservoir 88. For the dispensing device 12 to function properly, it is necessary that the density of the float means 104 be less than the density of the liquid to be dispensed, and the shape of the valve seat 106 substantially corresponds to the shape of the upper surface of the float means 104.

Preferably, the valve guide 100 is substantially cylindrical in shape, having a uniform circular cross-section extending the entire length of the valve guide 100. It is also preferable that the float means 104 comprises a buoyant spherical ball. However, as may be appreciated, the valve guide 100 and the float means 104 may adopt any shape as long as a length of the valve guide 100 adjacent the fluid outlet 110 has a substantially uniform cross-section, and as long as the cross-section of the float means 104 substantially corresponds to the cross-section of that length of valve-guide 100.

The valve guide 100 also includes a protrusion 114 adjacent the fluid inlet 112 of the valve guide 100 and radiating inwardly from the inner surface 116 of the valve guide 100. It will be appreciated that the protrusion 114 acts as a stop means preventing the ball 104 from sliding out from the internal passageway 102 of the valve guide 100. In the embodiment shown, the fluid inlet 112 of the valve guide 100 must be dimensioned to allow liquid to pass between the outer circumferential edge of the ball 104 and the inner surface 116 of the valve guide 100 when the ball 104 is positioned adjacent the protrusion 114.

In operation, one end of the dispensing tube 22 is fastened to the collar 44 of the pour spout 20, and the other end is fastened to the collar 84 of the cup 14. The container 12 is filled with the liquid to be dispensed, and the cup 14, dispensing tube 22, and lid 18 are inserted into the container 12. The lid 18 is then secured to the mouth 24 of the container 12 through the sealing ring 26, in the manner previously described. The length of the dispensing tube 22 is selected so that the open mouth 82 of the cup 14 presses and seals against the shoulder 74 of the well 72 when the lip 34 of the lid 18 engages the upper edge of the mouth 24 of the container 12.

Alternately, the cup 14 may be inserted in the container 12 before the container is filled with liquid, and the mouth 24 secured to the shoulder 74 through suitable sealing means as will be known to one skilled in the art. One end of the dispensing tube 22 can then be inserted into the collar 84 of the cup 14, and the other end of the dispensing tube 22 inserted into the collar 44 of the pour spout 48.

When the assembled dispensing device 10 is properly secured to the container 12 and is in the upright position, the liquid contained in the container 12 enters the measuring reservoir 88 through the inlet port 90. As the level of the liquid contained in the measuring reservoir 88 rises, the ball 104 is forced to slide upwards in the valve guide 100 until the ball 104 seals against the valve seat 106. At this point further fluid flow into the measuring reservoir 88 stops.

The container 12 is then rotated in preparation for dispensing the volume of liquid contained in the measuring reservoir 88. Due to the shape of the mouth 42 of the pouring spout 20, the dispensing device 10 will be rotated in a counter-clockwise direction 118, as shown in FIG. 1. As a result, the liquid contained in the measuring reservoir 88 will not flow out through the inlet port 90 when the dispensing device 10 is rotated. In addition, as the valve guide 100 has a substantially uniform cross-section adjacent the fluid outlet 110, the ball 104 will remain seated against the valve seat 106 until the container 12 is approximately horizontal. As a result, the volume of liquid to be dispensed will not fluctuate with the volume of liquid in the container 12.

When the container 12 is rotated past horizontal, the ball 104 will slide along the valve guide 100 and become unseated from the valve seat 106. The liquid contained in the measuring reservoir 88 will then flow between the outer surface of the ball 104 and the inner surface 116 of the valve guide 100, through the fluid outlet 110, along the dispensing tube 22, and out the pouring spout 20. As will be appreciated, the volume of liquid dispensed will be determined by the volume of the measuring reservoir 88. The container 12 is then returned to the upright position to allow the measuring reservoir 88 to refill.

One variation of the described invention is shown in FIG. 3. As shown therein, the valve guide 100 includes a plurality of longitudinally-extending slots 120 which extend between the outer surface 122 of the valve guide 100 and the inner surface 116. This variation is advantageous because the resulting reduced interior surface area of the valve guide 100 will produce less friction against the ball 104, allowing for faster filling and emptying of the measuring reservoir 88. In addition, the slots 120 themselves act as an enlarged fluid inlet 112, further increasing the speed at which the measuring reservoir 88 can be filled and emptied.

Figure 6:
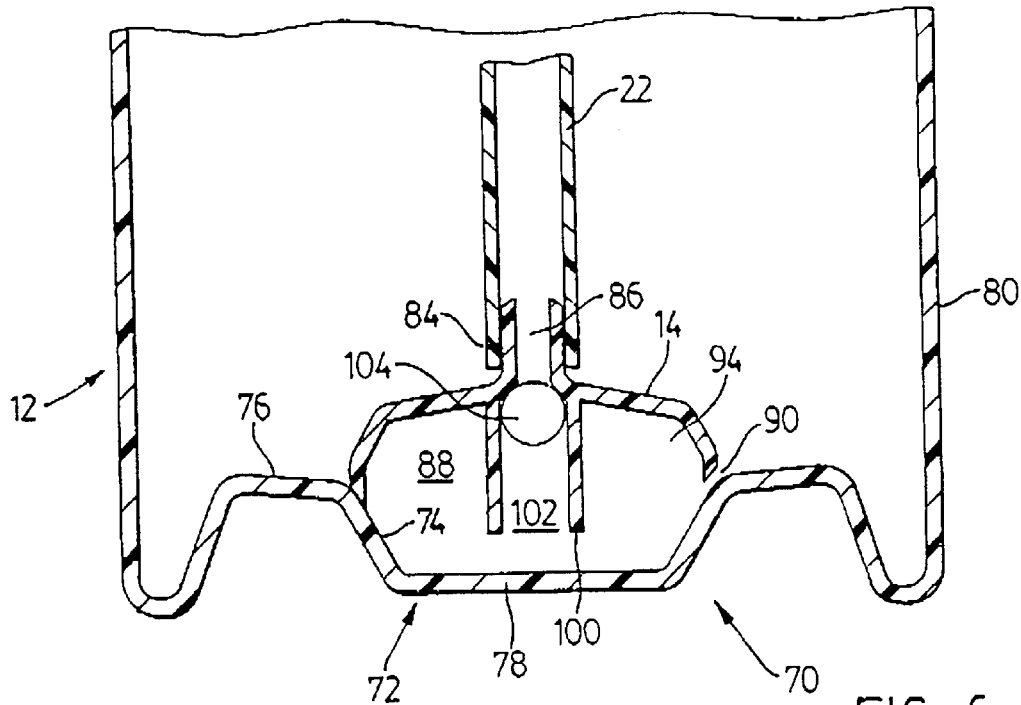
FIGS. 6 and 7 are longitudinal cross-sectional views of the lower portion of the liquid dispensing device.
Figure 7:
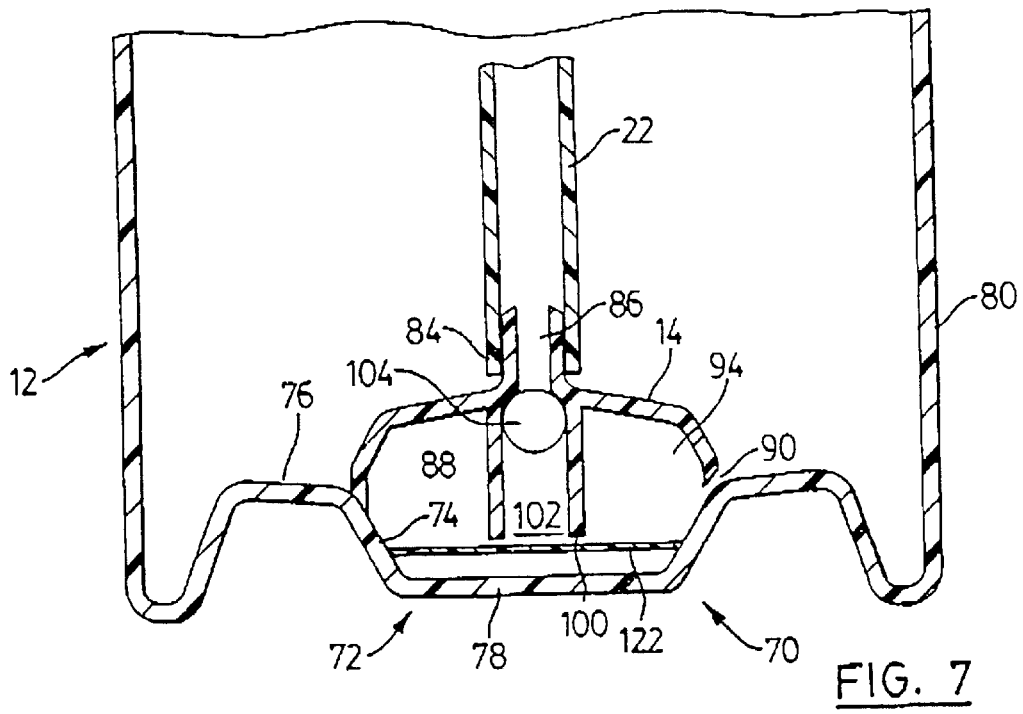

In another variation, shown in FIG. 6, the valve guide 100 is not provided with the stop means 114. Instead, the fluid inlet 112 is disposed in close proximity to the base 78, thereby preventing the ball 104 from sliding out from the internal passageway 102 of the valve guide 100. In yet another variation, shown in FIG. 7, the measuring reservoir 88 includes a porous screen 122 for filtering the liquid prior to entering the discharge tube 22. The screen 122 is positioned below the fluid inlet 112 and is sealed along its circumference to the shoulder 74.

In still another variation (not shown), the measuring reservoir 88 comprises a distinct unit suspended above the bottom 70 of the container 12. Alternately, the well 72 can be eliminated, as long as the position of the inlet port 90 relative to the end wall 38b is maintained as described above.

The description of the preferred embodiment is intended to be Illustrative, rather than exhaustive, of the present invention. Those of ordinary skill will be able to make certain additions, deletions, and/or modifications to the embodiment disclosed without departing from the spirit or scope of the invention, as defined by the appended claims.

I claim:

1. A device or dispensing a pre-determined volume of liquid from a container having a mouth, the dispensing device comprising:

a pour spout adapted for coupling to the mouth of the container;

an inverted cup including an interior cavity, a check valve disposed in said interior cavity, and a discharge port and an open mouth communicating with said interior cavity; and a dispensing tube coupling said pour spout to said discharge port, wherein the container comprises a side wall coupled to a bottom, said bottom including a well portion having a base and a shoulder, and said open mouth being adapted for sealing against said shoulder such that said cup, when disposed in the container, defines a measuring reservoir and includes an inlet port for receiving liquid.

2. The liquid dispensing device of claim 1, wherein said pour spout includes an end wall sloping inwardly towards a center of said pour spout, and said inlet port is positioned diametrically opposite to said end wall.

3. The liquid dispensing device of claim 1, wherein said cup has a volume and said well portion has a volume, and said volume of said cup is substantially equal to said volume of said well portion.

4. The liquid dispensing device of claim 3, wherein said cup and said well portion each have a substantially-circular cross-section.

5. The liquid dispensing device of claim 1, wherein said check valve comprises:

a tubular member having an internal passageway, and including a fluid outlet coupled to said discharge port and a fluid inlet opening into said interior cavity, a length of said tubular member adjacent said fluid outlet having a substantially uniform cross-section; and a float means slidably disposed within said internal passageway and having a density which is less than a density of the liquid, a cross-section which substantially corresponds to said cross-section of said length of tubular member, and a face shaped for sealing against said fluid outlet.

6. The liquid dispensing device of claim 5, wherein said tubular member has a pair of opposite ends, a first of said opposite ends comprising said fluid outlet and a second of said opposite ends comprising said fluid inlet.

7. The liquid dispensing device of claim 6, wherein said length of uniform cross-section extends substantially entirely between said opposite ends.

8. The liquid dispensing device of claim 7, wherein said uniform cross-section is substantially circular.

9. The liquid dispensing device of claim 5, wherein said tubular member includes stop means for preventing said float means from sliding out from said internal passageway.

10. The liquid dispensing device of claim 6, wherein said tubular member includes stop means for preventing said float means from sliding out from said internal passageway, said stop means comprising a protrusion disposed adjacent said second end and extending inwardly from an inner surface of said tubular member.

11. The liquid dispensing device of claim 5, wherein said fluid inlet comprises a plurality of longitudinally-extending slots extending between an outer surface of said tubular member and said internal passageway.

12. The liquid dispensing device of claim 5, wherein said float means comprises a buoyant spherical ball.

13. The liquid dispensing device of claim 2, wherein said pour spout is coupled to said container mouth through a lid, said lid including pressure equalization means positioned diametrically opposite to said end wall.

14. The liquid dispensing device of claim 13, wherein said pressure equalization means comprises a vent and a diaphragm adapted for sealing said vent.

15. The liquid dispensing device of claim 1, wherein said measuring reservoir includes a filter means provided in said interior cavity for filtering the liquid prior to entering said discharge port.

16. The liquid dispensing device of claim 15, wherein said filter means comprises a porous screen positioned below said discharge port and having a circumferential edge disposed in a sealing relationship with an interior surface of said measuring reservoir.

17. A device for dispensing a constant portion of liquid from a container having a mouth, the dispensing device comprising:

a pour spout adapted for coupling to the mouth of the container, said pour spout including an end wall sloping inwardly towards a center of said pour spout;

an inverted cup including an interior cavity, a check valve disposed in said interior cavity, and a discharge port and an open mouth communicating with said interior cavity; and a dispensing tube coupling said pour spout to said discharge port, wherein the container comprises a side wall coupled to a bottom, said bottom including a well portion comprising a base and a shoulder, and said open mouth being adapted for sealing against said shoulder such that said cup, when disposed in the container, defines a measuring reservoir including an inlet port positioned diametrically opposite to said end wall, said check valve comprising:

a tubular member having an internal passageway, and including a fluid outlet coupled to said discharge port and a fluid inlet opening into said interior cavity, a length of said tubular member adjacent said fluid outlet having a substantially uniform cross-section; and a float means slidably disposed within said internal passageway and having a density which is less than a density of the liquid, a cross-section which substantially corresponds to said cross-section of said length of tubular member, and a face shaped for sealing against said fluid outlet.

* * * * *